Figure 1:
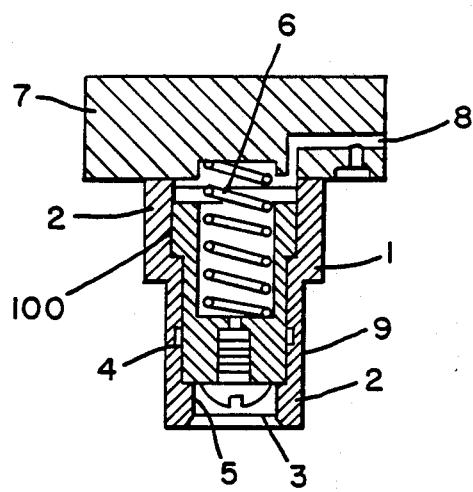

United States Patent [19]

Strassheimer

[11] Patent Number: 4,878,648
[45] Date of Patent: Nov. 7, 1989

[54] INSERT VALVE
[75] Inventor: Herbert Strassheimer, Wehrheim, Fed. Rep. of Germany
[73] Assignee: Paul Pleiger Maschinenfabrik GmbH & Co., Fed. Rep. of Germany
[21] Appl. No.: 323,265
[22] Filed: Mar. 15, 1989

Related U.S. Application Data
[63] Continuation of Ser. No. 114,905, Oct. 29, 1987, abandoned.

[30] Foreign Application Priority Data
Oct. 29, 1986 [DE] Fed. Rep. of Germany ....... 3636835

[51] Int. Cl.4 ........................................... F16K 31/122
[52] U.S. Cl. .................................... 251/63; 137/454.2
[58] Field of Search ................ 137/493, 454.2; 251/63

[56] References Cited
U.S. PATENT DOCUMENTS 4,121,619 10/1978 Paulikonis ....................... 137/493 X
4,190,073 2/1980 Claycomb ......................... 251/63 X
4,281,678 8/1981 Claycomb ......................... 251/63 X
4,679,586 7/1987 Riedel ............................. 137/493 X

FOREIGN PATENT DOCUMENTS 901061 7/1962 United Kingdom ................ 137/493

Primary Examiner—Alan Cohan
Attorney, Agent, or Firm—Austin R. Miller

[57] ABSTRACT

A removable insert valve provided with a piston which can be displaced in a bore in a valve housing by pressure fluid action, there being formed at one end of the bore a valve seat and a pressure fluid passage leading through the housing traversely to the bore. The piston is free of O-rings and is provided with first a ledge to constitute a pressure area in the region of the opening of the transverse passage into the bore in combination with a control pressure pump to selectively apply opening and closing pressure to a second ledge on the piston, in order to achieve more rapid operation of the valve.

5 Claims, 2 Drawing Sheets

INSERT VALVE

This application is a continuation of application Ser. No. 114,905, filed Oct. 29, 1987 now abandoned.

The invention relates to an insert valve of the type having a displaceable piston movable in a bore, a valve sent and a transverse pressure fluid passage.

Insert valves are known in various constructions as multiway valves. If pressure is being applied to the passage running transversely to the bore, and if the control pressure is removed from the upper side of the piston, then the piston is lifted from the valve seat by the pressure, which acts in the region of the valve seat on the bevel of the piston, by which the piston engages against the valve seat. The effective area available is then small, so that opening of the valve occurs relatively slowly, depending on the prevailing pressure.

The object underlying the invention is to provide an insert valve of the multiway type which operates more rapidly than valves of the prior art.

This object is achieved in accordance with this invention. By formation of a ledge on the piston in the region of the opening of the passage extending transversely to the bore, a greater effective area can be provided for the pressure prevailing in this passage, so that the result is rapid opening of an valve. Rapid opening/closing of the valve is enhanced by the omission of conventional rubber seals and supply of active working force to two operating areas on the valve. Additionally, by means of the increase in diameter in the upper part of the piston, the valve possesses a higher closing force.

Figure 2:
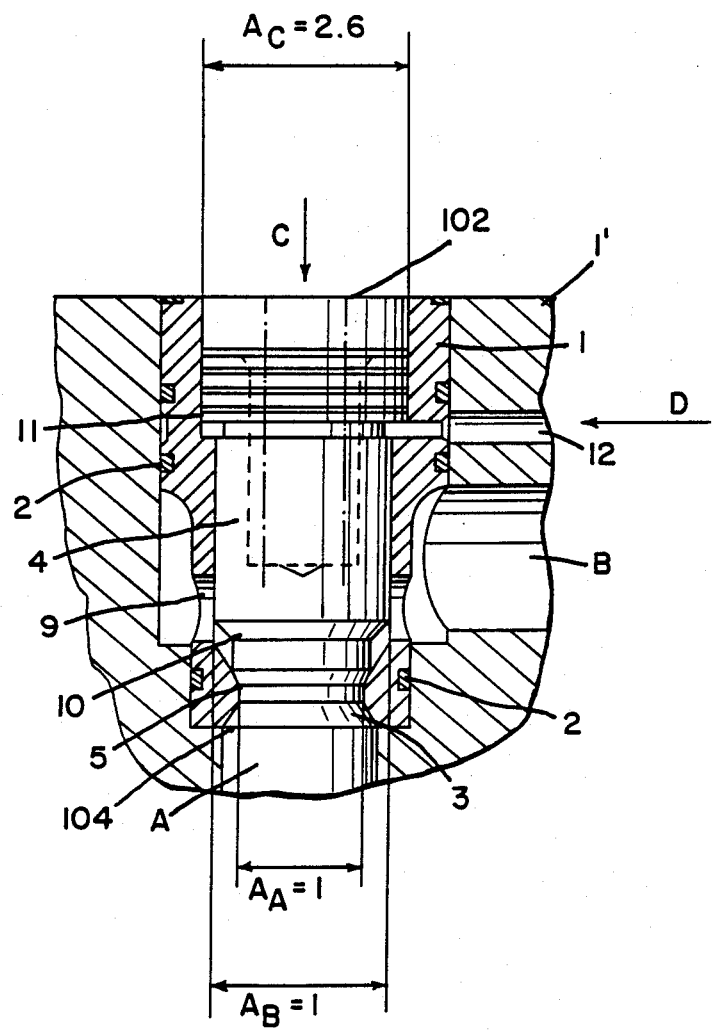

An exemplary embodiment of the invention will be described in more detail below with reference to the drawing, in which FIG. 1 shows a known embodiment of an insert valve in a sectional view and FIG. 2 shows a embodiment according to the invention in a partial section.

Figure 3:
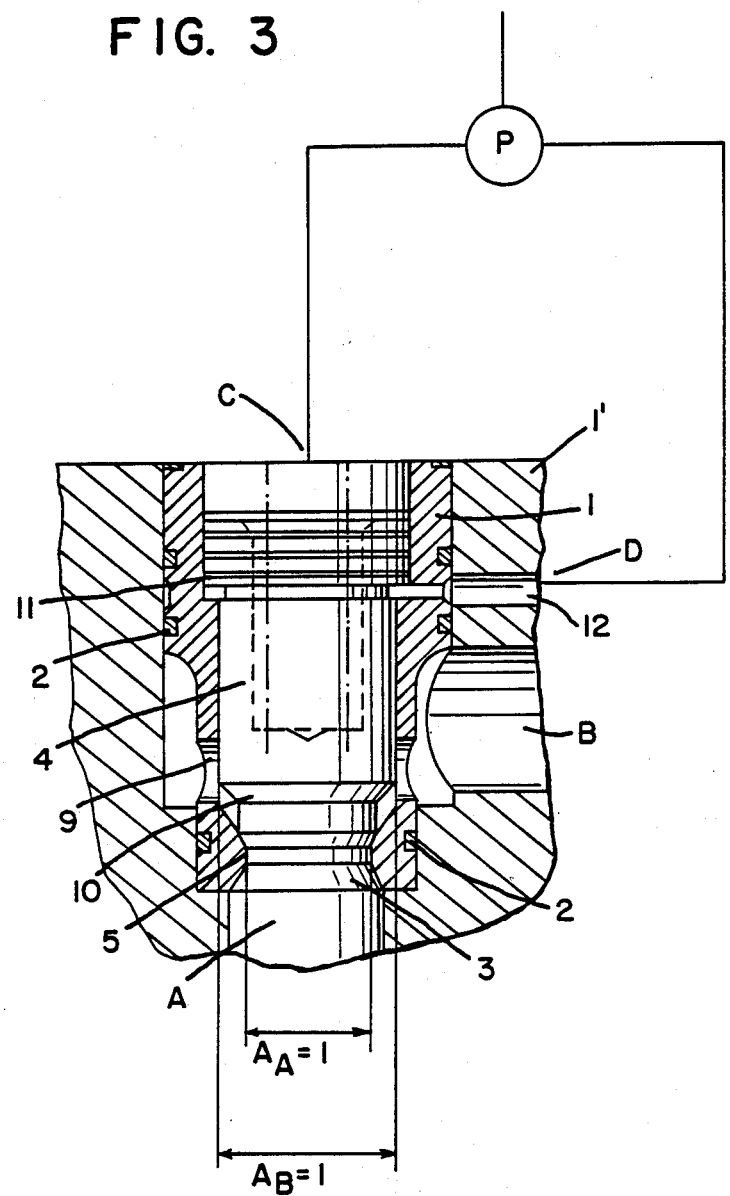

FIG. 3 shows the insert valve of FIG. 2 and a preferred associated control pressure pump.

FIG. 1 shows a multiway valve of the prior art, provided with with a roughly tubular housing 1, fitted into a bore in a surrounding housing and for this purpose is provided with sealing rings on the outer circumference at 2. A piston 4 can be displaced in the through bore 3 of the valve housing 1, and this piston engages with its lower end face against a valve seat 5, and is acted on by a spring 6 in the closing direction, the spring abutting against a housing part 7. A passage 8, for action on the top of the piston 4, leads through the housing part 7. Near the valve seat 5, a passage 9, extending transversely to the bore 3, leads through the valve housing 1. O-ring 100 circumferentially extends around piston 4 to provide a tight seal between housing 1 and piston 4. Seal 100 prevents escape of air/fluid from passage 8 to passage 9 and vice versa.

In known embodiments of such an insert valve, the piston 4 is beveled to the end face which engages against the valve seat 5, a part of the beveling lying above the valve seat 5 when the piston is in the closed condition, so that pressure within the passage 9 (FIG. 1) can lift the piston 4 from the valve seat 5, when control pressure 8 on the top of the piston is removed.

In the construction according to the invention as shown in FIG. 2, in which the same reference characters are used as in FIG. 1 for the same or corresponding components, the piston 4 is provided with a ledge 10 in the region of the openings of the passages 9, which are formed as bores distributed around the circumference of the valve housing 1, and the fluid pressure within opening B in FIG. 2 can act through openings 9 on this ledge 10, for lifting the piston 4 from the valve seat 5. This ledge 10 can be designed in a correspondingly large size so that rapid opening of the valve is achieved when control pressure is no longer exerted in the direction indicated by the arrow C on the upper end 102 of the piston 4.

Preferably the annular surface of the ledge 10, which is referenced as $A_B$ in FIG. 2, is designed to be the same area as the effective area of the bottom 104 of piston 10 exposed at A, which area is referenced as $A_A$. In FIG. 2 these two areas ($A_B$—$A_A$) and $A_A$ both indicated as equal to 1. In this way the fluid arriving at A or B meets equal pressure areas.

The ledge 10 can be proportioned according to the prevailing requirements. Thus, for example, the greatest diameter of the piston 4, which is referenced as $A_C$ in FIG. 2, can be in a ratio of 2.6:1 to the pressure area $A_A$. In this way the piston 4 can seal off a pressure exerted at A or at B which is up to 2.6 times greater than with a known embodiment.

In the embodiment according to FIG. 2, a ledge 11 is provided on the upper part of the piston, which can be acted on by a control pressure as indicated by the arrow D and exerted at 12.

The insert valve in accordance with the invention is remotely controlled; either by a control pressure pump P of its own, as shown in FIG. 3, connected to deliver selective pressure at connections C and D or by derivation of the control pressure directly out of the pressure passage, not on the other hand by the pressure out of one of the consumer connections A or B. The usual spring for acting on the piston can be omitted.

The valve housing 1 is of the easily removable type and is fitted into an outer housing or into a component 1'.

I claim:

1. A removable insert valve reciprocally operable for controlling fluid flow in both directions between spaced-apart fluid conducting ports, comprising:
   (a) a housing free of springs and having a longitudinally extending passageway;
   (b) a valve seat having a beveled sealing surface carried by said housing;
   (c) a piston movably mounted for reciprocation in said passageway to and from said seat, said piston having a beveled first surface positioned to directly contact said beveled sealing surface, said piston being free of O-rings or other means of providing a seal except said beveled first surface;
   (d) means including one of said ports for applying fluid under pressure endwise against a first endwise surface on said piston to move said piston in a direction away from said seat;
   (e) the other of said ports being laterally oriented for sidewise communication of pressure through said housing to said piston;
   (f) said piston having a beveled second surface spaced from said beveled first surface and communicating with said sidewise oriented port when said piston is seated on said seat, to move said piston in a direction away from said seat in response to pressure from said sidewise oriented port;
   (g) means providing a first control pressure port communicating with said piston for applying fluid under pressure against a second endwise surface on said piston in a direction to move said piston toward and into direct sealing contact with said seat;

(h) means providing a second control pressure port communicating with said piston to move said piston away from said seat;

(i) said piston having a third surface spaced from said first and second surfaces and communicating with said second control pressure port when said piston is seated on said seat, to move said piston in a direction away from said seat in response to pressure from said second control port; and (j) control means for selectively applying pressure to said first and second control pressure ports for external control of piston movement.

2. The insert valve defined in claim 1 wherein the area of said beveled second surface is essentially equal to the area of said first endwise surface on said piston.

3. The insert valve defined in claim 1 wherein the ratio of the areas of said secondwise surface and said beveled second surface is 2.6.

4. The insert valve of claim 1 wherein said control means selectively applies substantially equal control pressure to said first and second control pressure ports.

5. The insert valve of claim 1, wherein the other of said ports comprises at least two bores distributed around the circumference of said housing.

* * * * *